United States Patent
Fukazawa

(10) Patent No.: US 12,457,474 B2
(45) Date of Patent: Oct. 28, 2025

(54) DISTANCE NOTIFICATION DEVICE AND DISTANCE NOTIFICATION METHOD

(71) Applicant: JVCKENWOOD Corporation, Yokohama (JP)

(72) Inventor: Masaomi Fukazawa, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 313 days.

(21) Appl. No.: 18/364,496

(22) Filed: Aug. 3, 2023

(65) Prior Publication Data

US 2023/0396962 A1    Dec. 7, 2023

Related U.S. Application Data

(63) Continuation of application No. PCT/JP2022/004564, filed on Feb. 4, 2022.

(30) Foreign Application Priority Data

Feb. 26, 2021    (JP) .................................. 2021-030749

(51) Int. Cl.
    *H04L 1/00*      (2006.01)
    *G01C 21/16*      (2006.01)
    (Continued)

(52) U.S. Cl.
    CPC .......... *H04W 4/029* (2018.02); *G01C 21/185* (2020.08); *G01C 21/3632* (2013.01)

(58) Field of Classification Search
    CPC .... H04W 4/029; H04W 4/023; G01C 21/185; G01C 21/3632; G01C 21/005; G08B 21/02; H04M 1/72; H04M 11/00
    (Continued)

(56) References Cited

U.S. PATENT DOCUMENTS

2014/0187258 A1 * 7/2014 Khorashadi .......... G01C 21/206
     455/456.1
2017/0188196 A1 * 6/2017 Shen ....................... G01S 19/42
(Continued)

FOREIGN PATENT DOCUMENTS

CA      2677882 A1 * 3/2008 ......... G01S 5/02521
CA      2829286 A1 * 9/2012 ............... H04B 5/48
(Continued)

OTHER PUBLICATIONS

International Search Report and Written Opinion for International Application No. PCT/JP2022/004564 mailed on Mar. 8, 2022, 8 pages.

*Primary Examiner* — Tanmay K Shah
(74) *Attorney, Agent, or Firm* — Amin, Turocy & Watson, LLP

(57) ABSTRACT

A distance notification device includes a first and a second positional information acquiring units that acquire positional information on a user and peripheral users respectively at a predetermined time interval; a distance calculating unit that calculates respective distances between the user and the peripheral users based on the positional information; a distance determining unit that determines whether each of the distances is equal to or longer than a predetermined distance; a coordinate information calculating unit that calculates and update coordinate information on a meeting point based on the positional information; and a display that displays various images; wherein the display further notifies, by updating sequentially, the user of directional information toward the meeting point when a number of the peripheral users at a distance equal to or longer than the predetermined distance from the user is equal to or larger than a predetermined number.

5 Claims, 10 Drawing Sheets

(51) Int. Cl.
    *G01C 21/36*    (2006.01)
    *H04W 4/029*    (2018.01)
(58) Field of Classification Search
    USPC .................................................... 455/456.1
    See application file for complete search history.

(56)            References Cited

U.S. PATENT DOCUMENTS

2019/0373413  A1*  12/2019  Kong ...................... H04W 4/33
2020/0348143  A1*  11/2020  Godha .................... H04W 4/38

FOREIGN PATENT DOCUMENTS

JP      2001-108460      4/2001
JP      2002-333338     11/2002
JP      2004-328484     11/2004
WO      2016/006040      1/2016

* cited by examiner

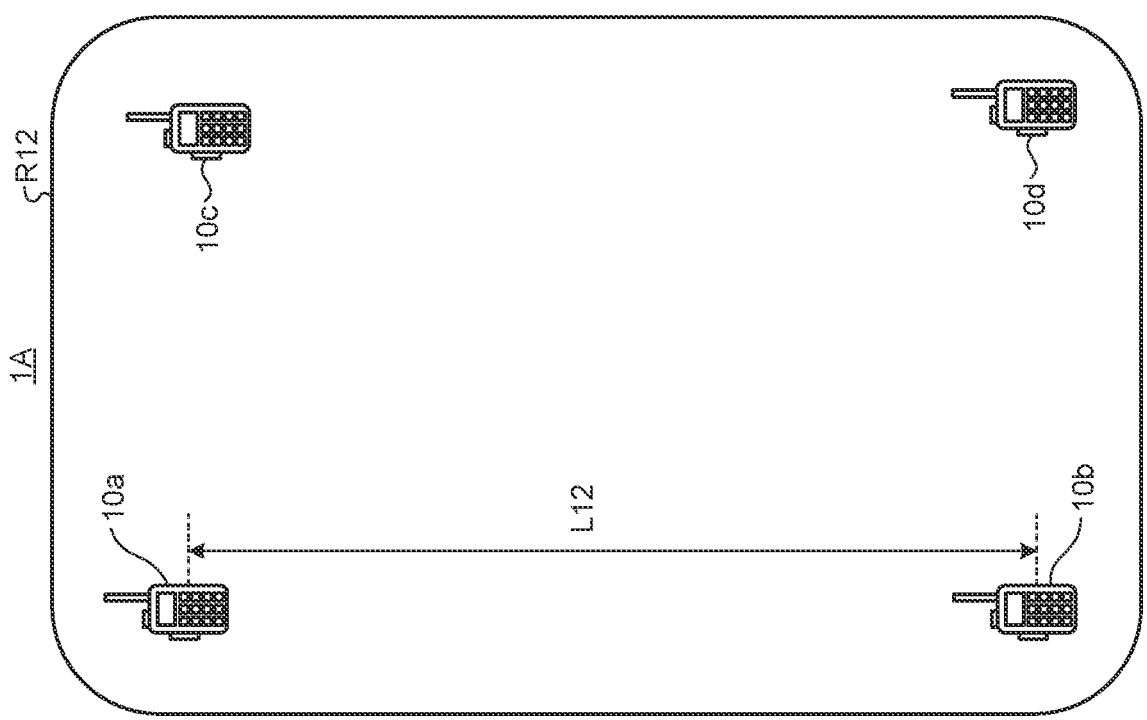
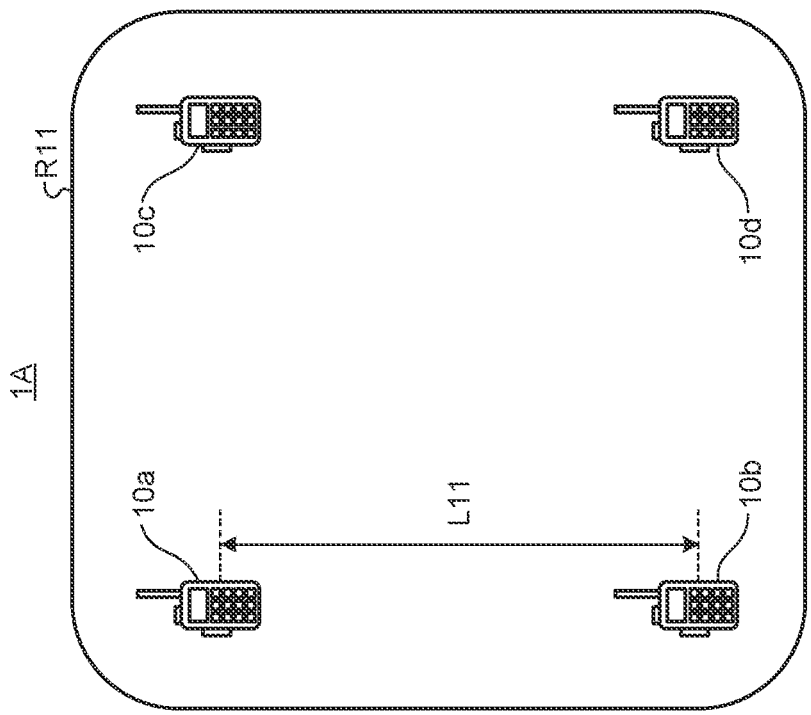
FIG.9

DISTANCE NOTIFICATION DEVICE AND DISTANCE NOTIFICATION METHOD

CROSS-REFERENCE TO RELATED APPLICATIONS

This application is a Continuation of PCT International Application No. PCT/JP2022/004564 filed on Feb. 4, 2022 which claims the benefit of priority from Japanese Patent Application No. 2021-030749 filed on Feb. 26, 2021, the entire contents of both of which are incorporated herein by reference.

FIELD OF THE INVENTION

The present application relates to a distance notification device and a distance notification method.

BACKGROUND OF THE INVENTION

A monitoring system in which multiple terminal devices which move in a region while maintaining distances between them are monitored is known (see, for example, Japanese Unexamined Patent Application, Publication No. 2004-328484).

In a case in which a team performs a search for a missing person or an object, members of the team perform the search by maintaining distances between the members to some extent. However, the search may cause a secondary disaster, in which, for example, one of the members of the team goes missing since the other members of the team do not notice that that the one member has separated from the team by a distance equal to or longer than a prescribed distance during the search.

SUMMARY OF THE INVENTION

A distance notification device and a distance notification method are disclosed.

According to one aspect of the present application, there is provided a distance notification device, comprising: a first positional information acquiring unit configured to acquire positional information on a user at a predetermined time interval; a second positional information acquiring unit configured to acquire positional information on multiple peripheral users present around the user and belonging to a group that the user belongs to at the predetermined time interval; a distance calculating unit configured to calculate respective distances between the user and the peripheral users based on the positional information on the user and the positional information on the peripheral users; a distance determining unit configured to determine whether or not each of the distances between the user and the peripheral users is equal to or longer than a predetermined distance; a coordinate information calculating unit configured to calculate and update coordinate information on a meeting point based on the positional information on the user and the positional information on the peripheral users; and a display configured to display various images; wherein the display is further configured to notify, by updating sequentially, the user of directional information toward the meeting point for the group that the user belongs to when a specific condition that a number of the peripheral users determined to be positioned at a distance equal to or longer than the predetermined distance from the user is equal to or larger than a predetermined number is satisfied, and to delete, if the directional information is notified, the directional information when the specific condition is not satisfied.

According to one aspect of the present application, there is provided a distance notification method, including steps of: acquiring positional information on a user at a predetermined time interval; acquiring positional information on multiple peripheral users present around the user and belonging to a group that the user belongs to at the predetermined time interval; calculating respective distances between the user and the peripheral users based on the positional information on the user and the positional information on the peripheral users; determining whether or not each of the distances between the user and the peripheral users is equal to or longer than a predetermined distance; calculating and updating coordinate information on a meeting point based on the positional information on the user and the positional information on the peripheral users; notifying, by updating sequentially, the user of directional information toward the meeting point for the group that the user belongs to when a specific condition that a number of the peripheral users determined to be positioned at a distance equal to or longer than the predetermined distance from the user is equal to or larger than a predetermined number is satisfied; and deleting, if the directional information is notified, the directional information when the specific condition is not satisfied.

BRIEF DESCRIPTION OF THE DRAWINGS

FIG. 9 is a diagram for explaining processes executed by the wireless communication system according to the second embodiment.

DETAILED DESCRIPTION OF THE INVENTION

Embodiments of the present application will be described hereinafter in detail, based on the drawings. According to the description of the embodiments, a distance notification device is implemented by a wireless communication device, but the present application is not to be limited by the embodiments described hereinafter.

First Embodiment

Figure 1:
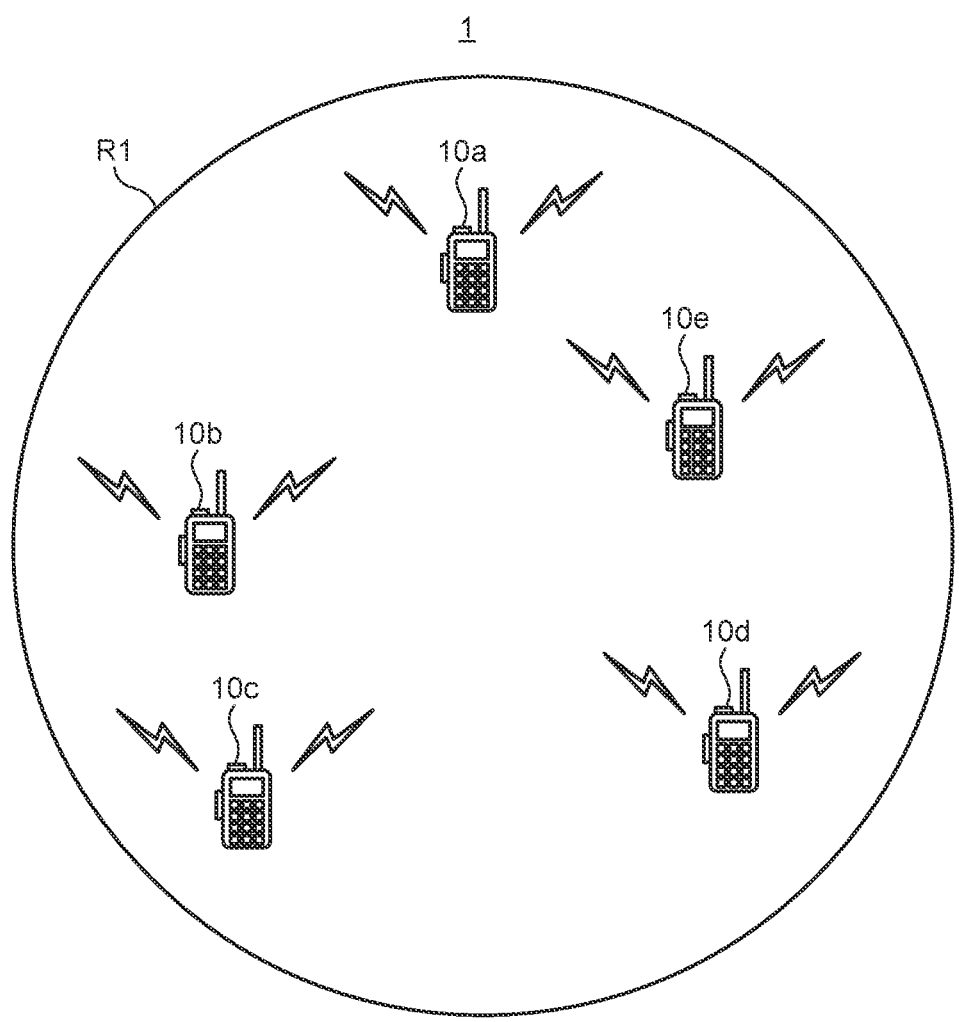
FIG. 1 is a diagram illustrating an example of a configuration of a wireless communication system according to a first embodiment.

Wireless Communication System A wireless communication system according to a first embodiment will be described using FIG. 1. FIG. 1 is a diagram illustrating an example of a configuration of the wireless communication system according to the first embodiment.

As illustrated in FIG. 1, a wireless communication system 1 includes a wireless communication device 10a, a wireless communication device 10b, a wireless communication device 10c, a wireless communication device 10d, and a wireless communication device 10e. In this first embodiment, a user who uses the wireless communication device 10a may simply be referred to as a user and users who use the wireless communication devices 10b to 10e may be referred to as peripheral users. In a case in which there is no need to distinguish the wireless communication devices 10a to 10e from one another, each of the wireless communication devices 10a to 10e may be generally referred to as a wireless communication device 10.

Examples of the wireless communication devices 10 include a portable wireless communication device, such as a wireless communication device for business use, a smartphone, and a tablet terminal, but the wireless communication device 10 is not limited to these examples. The wireless communication device 10 may be, for example, a gaming console.

Process executed by the wireless communication device 10a will be described mainly hereinafter, but each of the wireless communication devices 10b to 10e execute processes similar to the processes executed by the wireless communication device 10a.

The wireless communication device 10a acquires positional information on the user (the wireless communication device 10a) and positional information on the peripheral users (the wireless communication devices 10b to 10e). The wireless communication device 10a calculates, based on the positional information on the user (the wireless communication device 10a) and the positional information on the peripheral users (the wireless communication devices 10b to 10e), distances between the user (the wireless communication device 10a) and the peripheral users (the wireless communication devices 10b to 10e). In a case in which the distance between the user (the wireless communication device 10a) and any of the peripheral users (the wireless communication devices 10b to 10e) is equal to or longer than a predetermined distance, the wireless communication device 10a makes a notification to the user. The first embodiment thereby enables reduction of a secondary disaster in a search performed by teams.

Wireless Communication Device

Figure 2:
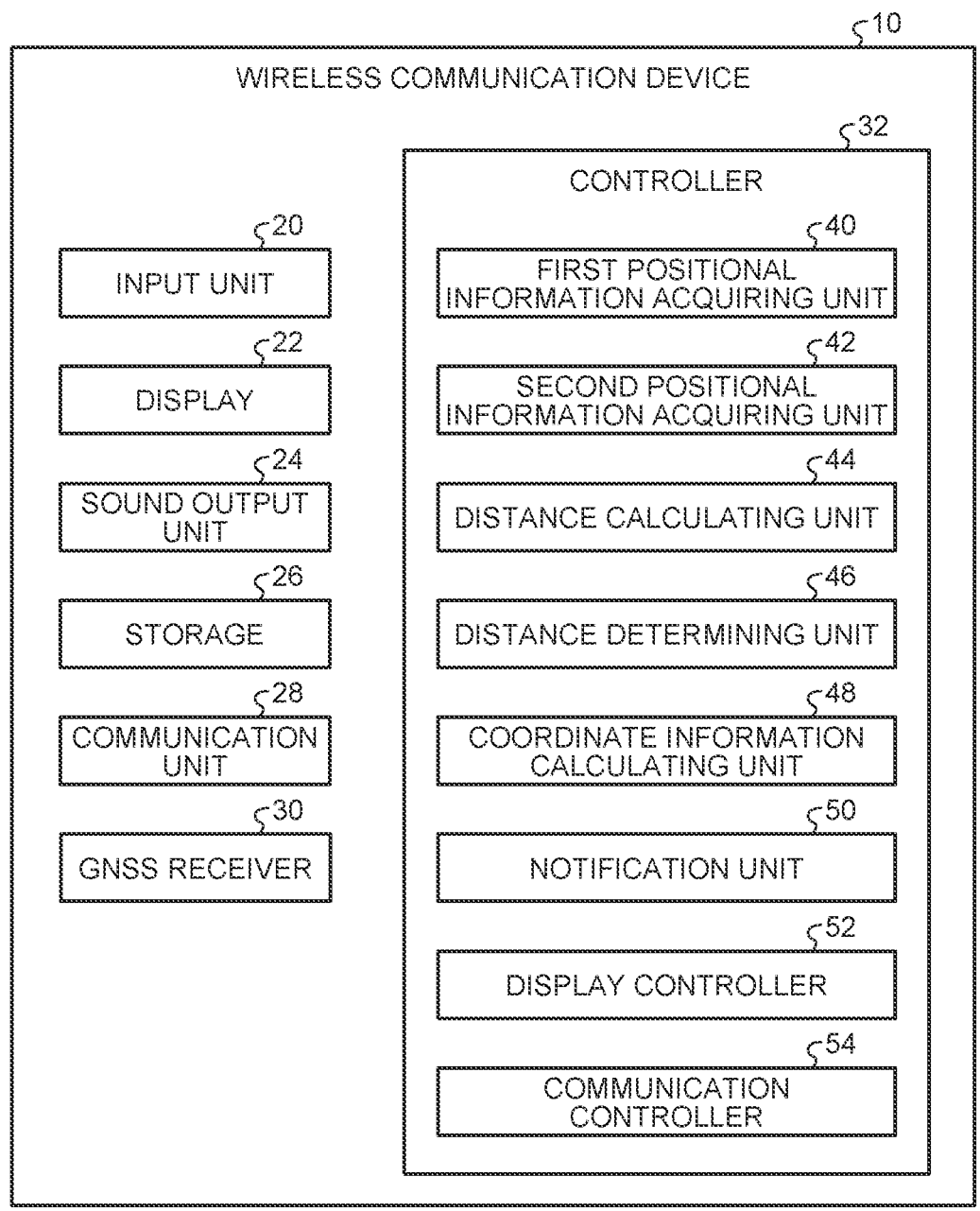
FIG. 2 is a block diagram illustrating an example of a configuration of a wireless communication device according to the first embodiment.

An example of a configuration of a wireless communication device according to the first embodiment will be described using FIG. 2. FIG. 2 is a block diagram illustrating the example of the configuration of the wireless communication device according to the first embodiment.

As illustrated in FIG. 2, a wireless communication device 10 includes an input unit 20, a display 22, a sound output unit 24, a storage 26, a communication unit 28, a global navigation satellite system (GNSS) receiver 30, and a controller 32.

The input unit 20 is an input device that receives various input operations on the wireless communication device 10. Examples of the input unit 20 include buttons, switches, a lever, numeric keys, a touch panel, and push-to-talk (PTT) buttons.

The display 22 displays various images. The display 22 includes, for example, a display, such as a liquid crystal display (LCD) or an organic electro-luminescence (EL) display. The display 22 may include, for example, a light emitting unit, such as a light emitting diode (LED). The input unit 20 and the display 22 may be integrally configured using a touch panel, for example.

The sound output unit 24 outputs various sounds. For example, the sound output unit 24 outputs at least one of a sound that notifies a user of a fact that the distance between the user and another user has become equal to or longer than a predetermined distance and a notification sound. The sound output unit 24 is implemented by, for example, a speaker.

The storage 26 is a memory that stores various kinds of information. The storage 26 stores, for example, information, such as a content of calculation executed by the controller 32, and a program. The storage 26 includes at least one of a random access memory (RAN), a main storage such as a read only memory (ROM), and an external storage such as a hard disk drive (HDD).

The communication unit 28 is a communication device that performs transmission and reception of various types of information between the wireless communication device 10 and an external device. The communication unit 28 performs, for example, transmission and reception of positional information on the wireless communication device 10 and positional information on other wireless communication devices 10 between these wireless communication devices 10.

The GNSS receiver 30 receives GNSS signals including information for determining the positional information, from GNSS satellites not illustrated in the drawings. The GNSS receiver 30 outputs the GNSS signals received, to the controller 32. The GNSS receiver 30 may be implemented by, for example, a GNSS receiving circuit or a GNSS receiving device.

The controller 32 controls an operation of each unit in the wireless communication device 10. The controller 32 is implemented by, for example, a central processing unit (CPU) or a micro processing unit (MPU) executing a program stored in the storage 26, with a RAM serving as a work area. The controller 32 may be implemented by, for example, an integrated circuit, such as an application specific integrated circuit (ASIC) or a field programmable gate array (FPGA). The controller 32 may be implemented by a combination of hardware and software.

The controller 32 includes a first positional information acquiring unit 40, a second positional information acquiring unit 42, a distance calculating unit 44, a distance determining unit 46, a coordinate information calculating unit 48, a notification unit 50, a display controller 52, and a communication controller 54. The first positional information acquiring unit 40 receives GNSS signals from the GNSS receiver 30. Based on the GNSS signals, the first positional information acquiring unit 40 calculates current positional information on the wireless communication device 10. The first positional information acquiring unit 40 calculates, for example, terrestrial coordinates as the current position of the wireless communication device 10.

The second positional information acquiring unit 42 acquires positional information on other wireless communication devices 10. The second positional information acquiring unit 42 acquires, for example, information indicating terrestrial coordinates of the current position of other wireless communication devices 10.

The distance calculating unit 44 calculates a distance between the wireless communication device 10 and each of the other wireless communication devices 10. For example, based on the positional information acquired by the first positional information acquiring unit 40 and the positional information acquired by the second positional information acquiring unit 42, the distance calculating unit 44 calculates the distance between the wireless communication device 10 and each of the other wireless communication devices 10.

The distance determining unit 46 determines whether or not the distance between the wireless communication device 10 and each of the other wireless communication devices 10 is equal to or longer than a predetermined distance. The predetermined distance is a distance indicating a possibility that the user carrying the wireless communication device 10 and peripheral users carrying the other wireless communication devices 10 have become separated from each other. The user may set this distance indicating the possibility of separation at any distance according to the location at which the search is performed. That is, the distance determining unit 46 determines whether or not the user and the peripheral users have become separated from each other.

The coordinate information calculating unit 48 calculates coordinates of a meeting point of the user and the peripheral users. In a case in which the distance determining unit 46 has determined that one of the distances between the user and the peripheral users is equal to or longer than the predetermined distance, for example, the coordinate information calculating unit 48 calculates the coordinates of the meeting point based on the positional information on the user and the positional information on the peripheral users.

The notification unit 50 controls the display 22 to make a notification. For example, in a case in which one of the distance between the user and the peripheral users has become equal to or longer than the predetermined distance, the notification unit 50 controls the display 22 to cause the display 22 to display information indicating the meeting point. The information indicating the meeting point may be coordinate information on a predetermined meeting point or coordinate information calculated by the coordinate information calculating unit 48.

The display controller 52 controls the display 22 to cause the display 22 to display various kinds of information.

The communication controller 54 controls the communication unit 28 to control communication between the wireless communication device 10 and an external device. For example, by controlling the communication unit 28, the communication controller 54 controls communication between the wireless communication device 10 and the other wireless communication devices 10.

Content of Processing

Figure 3:
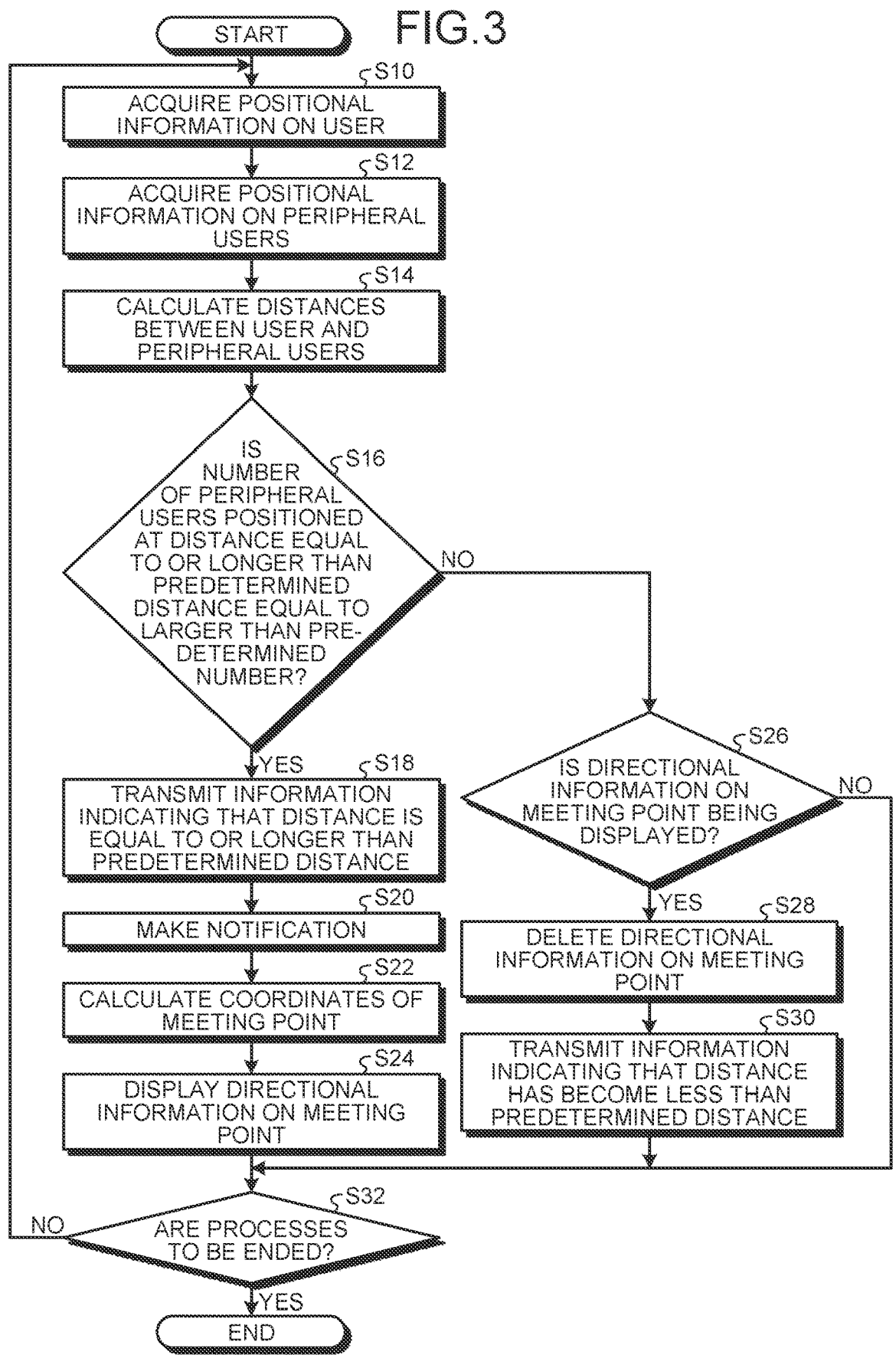
FIG. 3 is a flowchart illustrating an example of a flow of processes executed by the wireless communication device according to the first embodiment.

Processes executed by the wireless communication device according to the first embodiment will be described using FIG. 3. FIG. 3 is a flowchart illustrating an example of a flow of the processes executed by the wireless communication device according to the first embodiment.

When multiple users carrying the wireless communication devices 10 form a team and perform a search for a missing person or an object, the process illustrated in FIG. 3 is executed by each of the wireless communication devices 10.

The controller 32 acquires positional information on a user (Step S10). Specifically, based on GNSS signals received by the GNSS receiver 30, the first positional information acquiring unit 40 calculates positional information on the wireless communication device 10 to calculate the positional information on the user. The flow then proceeds to Step S12.

The controller 32 acquires positional information on peripheral users (Step S12). Specifically, by acquiring positional information on the other wireless communication devices 10 via the communication unit 28, the second positional information acquiring unit 42 acquires the positional information on the peripheral users. For example, the second positional information acquiring unit 42 acquires the positional information on the peripheral users at a predetermined time interval. The predetermined time interval is, for example, ten seconds, but is not limited to this example. The flow then proceeds to Step S14.

The controller 32 calculates a distance between the user and each of the peripheral users (Step S14). Specifically, based on the positional information on the user acquired at Step S10 and the positional information on the peripheral users acquired at Step S12, the distance calculating unit calculates the distance between the user and each of the peripheral users.

Figure 4:
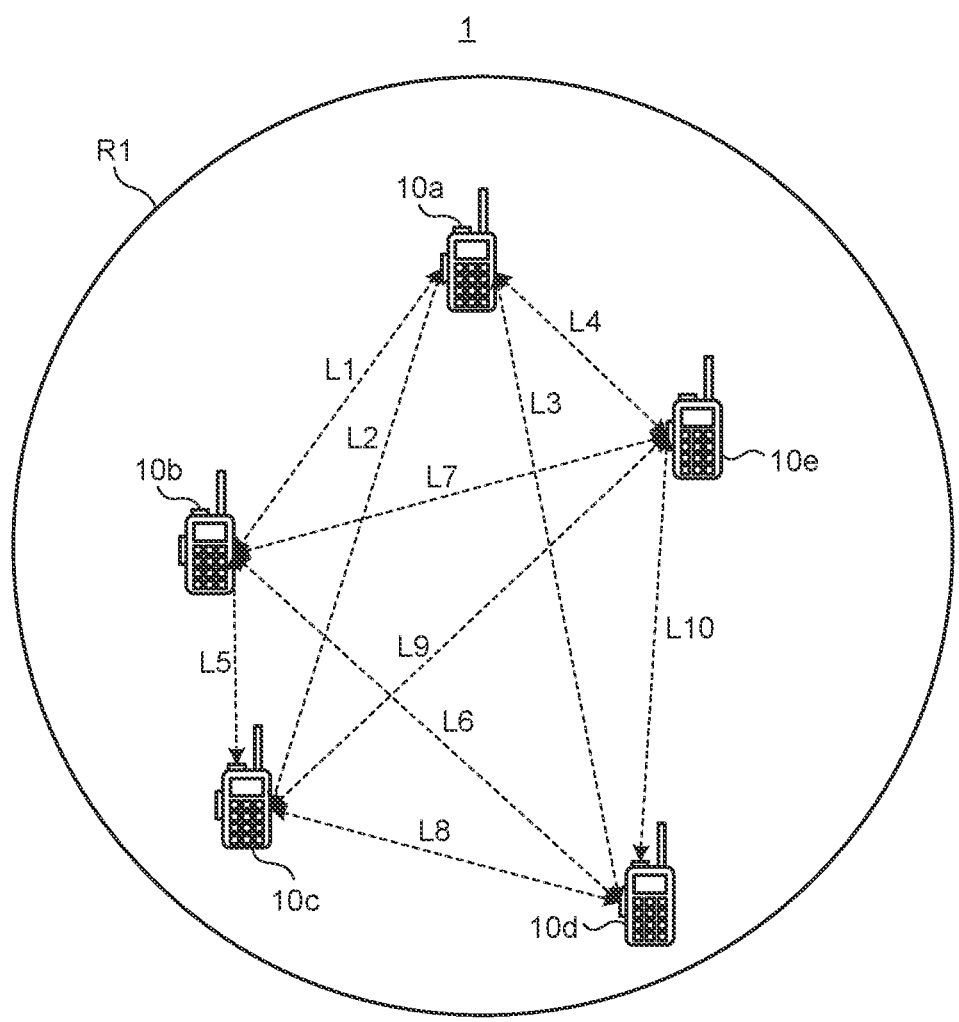
FIG. 4 is a diagram for explaining a method of calculating distances between a user and peripheral users, according to the first embodiment.

A method of calculating the distance between the user and each of the peripheral users, according to the first embodiment, will be described using FIG. 4. FIG. 4 is a diagram for explaining the method of calculating the distance between the user and each of the peripheral users, according to the first embodiment.

As illustrated in FIG. 4, the wireless communication system 1 is assumed herein to include the wireless communication device 10a, the wireless communication device 10b, the wireless communication device 10c, the wireless communication device 10d, and the wireless communication device 10e.

The distance calculating unit 44 of the wireless communication device 10a calculates a distance L1 between the wireless communication device 10a and the wireless communication device 10b, based on positional information on the wireless communication device 10a and positional information on the wireless communication device 10b. The distance calculating unit 44 of the wireless communication device 10a calculates a distance L2 between the wireless communication device 10a and the wireless communication device 10c, based on the positional information on the wireless communication device 10a and positional information on the wireless communication device 10c. The distance calculating unit 44 of the wireless communication device 10a calculates a distance L3 between the wireless communication device 10a and the wireless communication device 10d, based on the positional information on the wireless communication device 10a and positional information on the wireless communication device 10d. The distance calculating unit 44 of the wireless communication device 10a calculates a distance L4 between the wireless communication device 10a and the wireless communication device 10e, based on the positional information on the wireless communication device 10a and positional information on the wireless communication device 10e.

The wireless communication devices 10b to 10e also calculate their distances from each of the other wireless communication devices.

The distance calculating unit 44 of the wireless communication device 10b calculates the distance L1 between the wireless communication device 10a and the wireless communication device 10b, based on the positional information on the wireless communication device 10b and the positional information on the wireless communication device 10a. The distance calculating unit 44 of the wireless communication device 10b calculates a distance L5 between the wireless communication device 10b and the wireless communication device 10c, based on the positional information on the wireless communication device 10b and the positional information on the wireless communication device 10c. The distance calculating unit 44 of the wireless communication device 10b calculates a distance L6 between the wireless communication device 10b and the wireless communication device 10d, based on the positional information on the wireless communication device 10b and the positional information on the wireless communication device 10d. The distance calculating unit 44 of the wireless communication device 10b calculates a distance L7 between the wireless communication device 10b and the wireless communication device 10e, based on the positional information on the wireless communication device 10b and the positional information on the wireless communication device 10e.

The distance calculating unit 44 of the wireless communication device 10c calculates the distance L2 between the wireless communication device 10a and the wireless communication device 10c, based on the positional information on the wireless communication device 10c and the positional information on the wireless communication device 10a. The distance calculating unit 44 of the wireless communication device 10c calculates the distance L5 between the wireless communication device 10b and the wireless communication device 10c, based on the positional information on the wireless communication device 10c and the positional information on the wireless communication device 10b. The distance calculating unit 44 of the wireless communication device 10c calculates a distance L8 between the wireless communication device 10c and the wireless communication device 10d, based on the positional information on the wireless communication device 10c and the positional information on the wireless communication device 10d. The distance calculating unit 44 of the wireless communication device 10c calculates a distance L9 between the wireless communication device 10c and the wireless communication device 10e, based on the positional information on the wireless communication device 10c and the positional information on the wireless communication device 10e.

The distance calculating unit 44 of the wireless communication device 10d calculates the distance L3 between the wireless communication device 10a and the wireless communication device 10d, based on the positional information on the wireless communication device 10d and the positional information on the wireless communication device 10a. The distance calculating unit 44 of the wireless communication device 10d calculates the distance L6 between the wireless communication device 10b and the wireless communication device 10d, based on the positional information on the wireless communication device 10d and the positional information on the wireless communication device 10b. The distance calculating unit 44 of the wireless communication device 10d calculates the distance L8 between the wireless communication device 10c and the wireless communication device 10d, based on the positional information on the wireless communication device 10d and the positional information on the wireless communication device 10c. The distance calculating unit 44 of the wireless communication device 10d calculates a distance L10 between the wireless communication device 10d and the wireless communication device 10e, based on the positional information on the wireless communication device 10d and the positional information on the wireless communication device 10e.

The distance calculating unit 44 of the wireless communication device 10e calculates the distance L4 between the wireless communication device 10a and the wireless communication device 10e, based on the positional information on the wireless communication device 10e and the positional information on the wireless communication device 10a. The distance calculating unit 44 of the wireless communication device 10e calculates the distance L7 between the wireless communication device 10b and the wireless communication device 10e, based on the positional information on the wireless communication device 10e and the positional information on the wireless communication device 10b. The distance calculating unit 44 of the wireless communication device 10e calculates the distance L9 between the wireless communication device 10c and the wireless communication device 10e, based on the positional information on the wireless communication device 10e and the positional information on the wireless communication device 10c. The distance calculating unit 44 of the wireless communication device 10e calculates the distance L10 between the wireless communication device 10d and the wireless communication device 10e, based on the positional information on the wireless communication device 10e and the positional information on the wireless communication device 10d.

That is, each of the wireless communication devices 10 included in the wireless communication system 1 calculates the distances between the user and the peripheral users by calculating the distance between the wireless communication device 10 and each of the other wireless communication devices 10.

The process will be described hereinafter as a process executed by the wireless communication device 10a. A process executed by each of the wireless communication devices 10b to 10e is similar to the process executed by the wireless communication device 10a and description thereof will thus be omitted.

Description will now be made by reference to FIG. 3 again. The controller 32 determines whether or not the number of peripheral user positioned at a distance equal to or longer than the predetermined distance is equal to or larger than a predetermined number (Step S16). Specifically, in the example illustrated in FIG. 4, the distance determining unit 46 of the wireless communication device 10a determines whether or not the number of the distance equal to or longer than the predetermined distance among the distances L1 to L4 is equal to or larger than the predetermined number. The predetermined distance is, for example, 100 meters, but without being limited to this example, the predetermined distance may be set at any distance. The predetermined number may be one or more. In a case in which it has been determined that the number of users positioned at the distance equal to or longer the predetermined distance is equal to or larger than the predetermined number (Step S16; Yes), the flow proceeds to Step S18. In a case in which it has been determined that the number of users positioned at the distance equal to or longer than the predetermined distance is not equal to or larger than the predetermined number (Step S16; No), the flow proceeds to Step S26.

In a case in which a result of the determination is "Yes" at Step S16, the controller 32 transmits information indicating that the distance/distances is/are equal to or larger than the predetermined distance, to the other wireless communication devices 10 (Step S18). Specifically, the communication controller 54 of the wireless communication device 10a transmits to the wireless communication devices 10b to 10e, via the communication unit 28, information indicating that the distance/distances has/have become equal to or longer than the predetermined distance. The flow then proceeds to Step S20.

The controller 32 makes a notification (Step S20). Specifically, by controlling the sound output unit 24 to output an alarm, the notification unit 50 makes a notification of the fact that there is a user that has become separated by a distance equal to or longer the predetermined distance. The alarm is, for example, sound effects consecutively output, like "Peep, peep, peep . . . ", but is not limited to this example. The flow then proceeds to Step S22.

The controller 32 calculates coordinates of a meeting point (Step S22). Specifically, based on the positional information on the wireless communication devices 10*a* to 10*e*, the coordinate information calculating unit 48 of the wireless communication device 10*a* calculates the coordinates of the meeting point.

Figure 5:
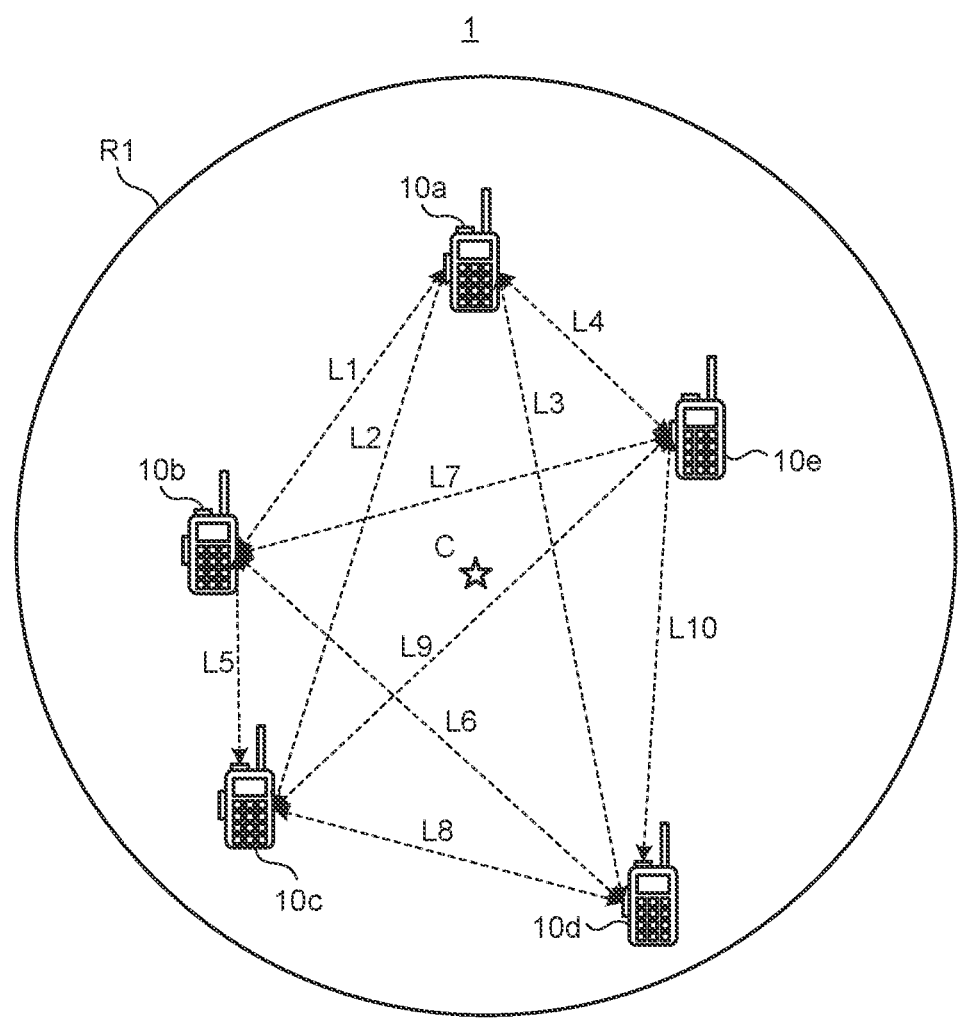
FIG. 5 is a diagram for explaining a method of calculating coordinates of a meeting point.

A method of calculating coordinates of a meeting point will be described using FIG. 5. FIG. 5 is a diagram for explaining the method of calculating coordinates of a meeting point.

As illustrated in FIG. 5, the coordinate information calculating unit 48 calculates coordinates C of a meeting point based on the positional information on the wireless communication devices 10*a* to 10*e*. The coordinates C are, for example, coordinates in a center of the wireless communication devices 10*a* to 10*e*. For example, in a case in which the positional information is expressed by longitude and latitude, the coordinates C of a gravity center (an average) of the longitudes and the latitudes of all of the five points at which the wireless communication devices 10*a* to 10*e* are located on a two-dimensional plane are determined. The coordinates C are not limited to a coordinates in the center of the wireless communication devices 10*a* to 10*e*, and may be coordinates of one of the wireless communication devices 10*a* to 10*e*, the one being carried by a leader of the team. The coordinates C may be coordinates of a predetermined meeting point. That is, the meeting point may be determined optionally according to the design.

Description will now be made by reference to FIG. 3 again. The controller 32 displays directional information on the meeting point (Step S24). Specifically, the notification unit 50 of the wireless communication device 10*a* controls the display 22 to display the directional information on the meeting point.

Figure 6:
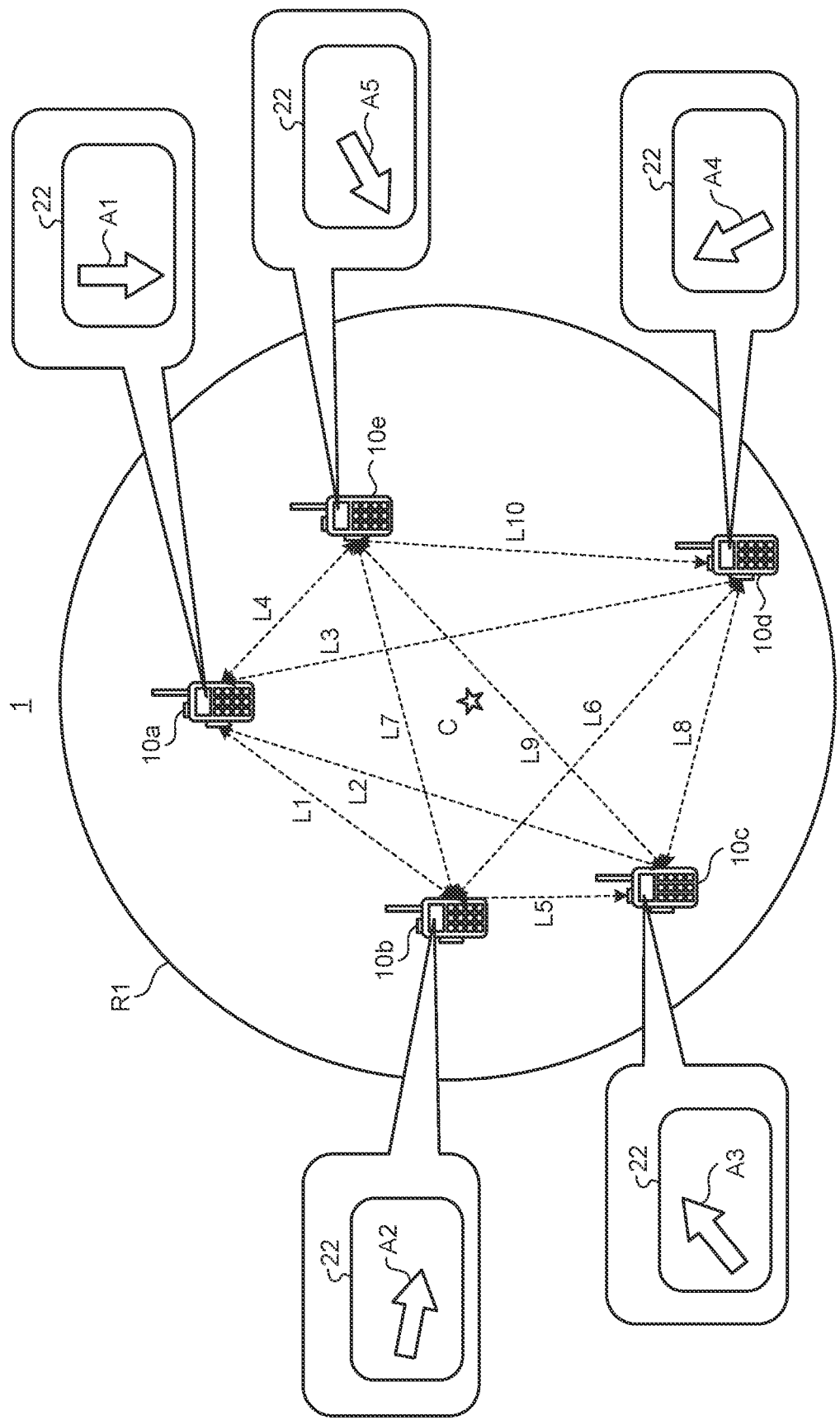
FIG. 6 is a diagram for explaining a method of displaying directional information on the meeting point.

A method of displaying the directional information on the meeting point will be described using FIG. 6. FIG. 6 is a diagram for explaining a method of displaying the direction information on the meeting point.

As illustrated in FIG. 6, the notification unit 50 of the wireless communication device 10*a* causes the display 22 of the wireless communication device 10*a* to display an arrow A1 that is directional information on the meeting point. The arrow A1 is an arrow indicating a direction for the coordinates C of the meeting point. The user is thereby able to move to the meeting point by following the arrow A1. As illustrated in FIG. 6, an arrow A2 is displayed on the display 22 of the wireless communication device 10*b*, an arrow A3 is displayed on the display 22 of the wireless communication device 10*c*, an arrow A4 is displayed on the display 22 of the wireless communication device 10*d*, and an arrow A5 is displayed on the display 22 of the wireless communication device 10*e*. The arrows A2 to A5 are respectively arrows indicating directions for the meeting point as viewed from the wireless communication devices 10*b* to 10*e*. That is, in this first embodiment, even in a case in which only one of the wireless communication devices 10 has been determined to be at a distance equal to or longer than the predetermined distance during the team is performing a search, the directional information on the meeting point is displayed on the wireless communication devices 10 for all members of the team.

Description will now be made by reference to FIG. 3 again. In a case in which a result of the determination made at Step S16 is "No", the controller 32 determines whether or not the directional information on the meeting point is being displayed (Step S26). In a case in which it has been determined that the direction of the meeting point is being displayed (Step S26; Yes), the flow proceeds to Step S28. In a case in which it has been determined that the direction of the meeting point is not being displayed (Step S26; No), the flow proceeds to Step S32.

In a case in which a result of the determination made at Step S26 is "Yes", the controller 32 deletes the directional information on the meeting point (Step S28). Specifically, the notification unit 50 of the wireless communication device 10*a* causes the display 22 of the wireless communication device 10*a* to be turned off so that the directional information is no longer displayed. The flow then proceeds to Step S30.

The controller 32 transmits information indicating that the distance/distances has/have become less than the predetermined distance (Step S30). Specifically, the communication controller 54 of the wireless communication device 10*a* transmits to the wireless communication devices 10*b* to 10*e*, via the communication unit 28, information indicating that the distance/distances has/have become less than the predetermined distance. The flow then proceeds to Step S32.

After Step S24, in a case in which a result of the determination made at Step S26 is "No", or after Step S30, the controller 32 determines whether or not the processes are to be ended (Step S32). Specifically, in a case in which the controller 32 has received an operation to turn the power off, or in a case in which the controller 32 has received an operation to end the processes, the controller 32 determines that the processes are to be ended. In a case in which it has been determined that the processes are to be ended (Step S32; Yes), the processes in FIG. 3 are ended. In a case in which it has been determined that the processes are not to be ended (Step S32; No), the flow proceeds to Step S10.

Figure 7:
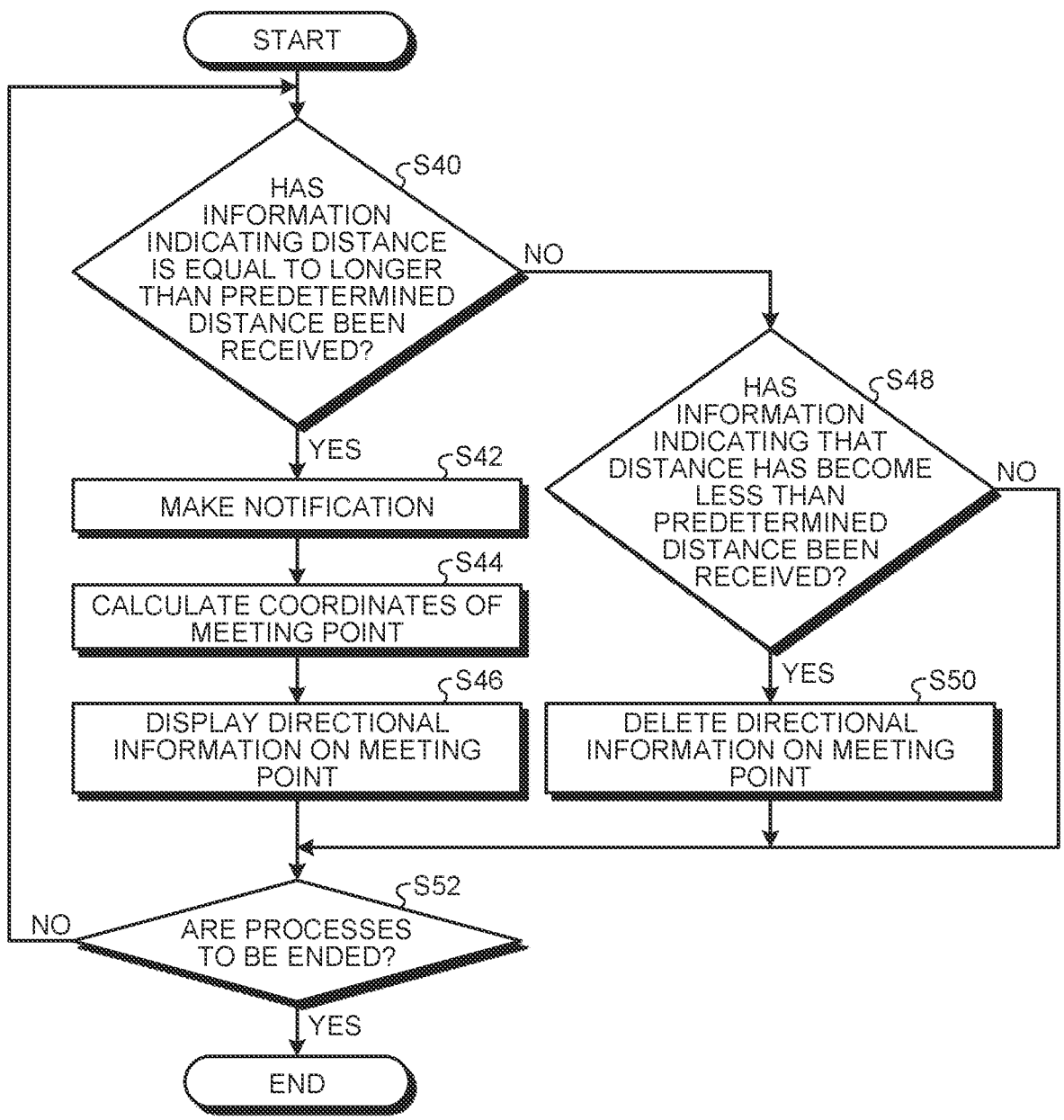
FIG. 7 is a flowchart illustrating an example of a flow of processes executed by the wireless communication device according to the first embodiment.

A process executed by the wireless communication device according to the first embodiment will be described using FIG. 7. FIG. 7 is a flowchart illustrating an example of a flow of processes executed by the wireless communication device according to the first embodiment.

The processes illustrated in FIG. 7 is a notification process executed in a case in which information has been received when multiple users carrying the wireless communication devices 10 form a team to perform a search for a missing person or an object, the information indicating that one of the wireless communication devices has become separated from the other wireless communication devices by a distance equal to or longer than the predetermined distance. However, the process in FIG. 7 is not necessarily required. In a case in which the process in FIG. 7 is not to be executed, a notification and the direction of a meeting point are displayed, through the processes in FIG. 3, only at the wireless communication device 10 that has become separated from the team by a distance equal to or longer than the predetermined distance.

The controller 32 determines whether or not information has been received, the information indicating that the wireless communication device 10 is separate from the other wireless communication devices 10 by a distance equal to or longer than the predetermined distance (Step S40). Specifically, the communication controller 54 of the wireless communication device 10a determines whether or not information has been received, the information indicating that the wireless communication device 10a is separate from at least one of the wireless communication devices 10b to 10e by a distance equal to or longer than the predetermined distance. In a case in which it has been determined that the information has been received, the information indicating that the wireless communication device 10 is separate from any of the other wireless communication devices 10 by a distance equal to or longer than the predetermined distance (Step S40; Yes), the flow proceeds to Step S42. In a case in which it is determined that the information has not been received, the information indicating that the wireless communication device 10 is separate from any of the other wireless communication devices 10 by a distance equal to or longer than the predetermined distance (Step S40; No), the flow proceeds to Step S48.

Processes at Step S42 to Step S46 are the same as the processes at Step S20 to Step S24 respectively illustrated in FIG. 3 and description thereof will thus be omitted.

In a case in which a result of the determination made at Step S40 is "No", the controller 32 determines whether or not information has been received, the information indicating that the distance between the wireless communication device 10 and the other wireless communication device 10 has become less than the predetermined distance (Step S48). Specifically, the communication controller 54 of the wireless communication device 10a determines whether or not information has been received, the information indicating that the distance between the wireless communication device 10a and one of the wireless communication devices 10b to 10e has become less than the predetermined distance, from the other wireless communication device from which the information indicating that the distance had been equal to or longer than the predetermined distance was received at Step S40. In a case in which it is determined that the information has been received, the information indicating that the distance from the other wireless communication device 10 has become less than the predetermined distance (Step S48; Yes), the flow proceeds to Step S50. In a case in which it is determined that the information has not been received, the information indicating that the distance from the other wireless communication device 10 has become less than the predetermined distance (Step S48; No), the flow proceeds to Step S52.

Processes at Step S50 and Step S52 are respectively the same as the processes at Step S28 and Step S32 illustrated in FIG. 3 and description thereof will thus be omitted.

As described above, in this first embodiment, in a case in which it is determined that there is a user that has become separated from a team by a distance equal to or longer than the predetermined distance when the team has been formed and performs a search, directional information indicating the direction of a meeting place is displayed. Members of the team are thereby able to move to the meeting point and a secondary disaster, such as any member of the team going missing, is able to be prevented.

Second Embodiment

A process executed by a wireless communication system according to a second embodiment will be described using FIG. 8, FIG. 9, and FIG. 10. Each of FIG. 8 to FIG. 10 is a diagram for explaining processes executed by the wireless communication system according to the second embodiment.

When a team performs a search in formation, this second embodiment enables the search to be performed with changing the distances between the members of the team according to a prospect at a place where the search is performed.

Figure 8:
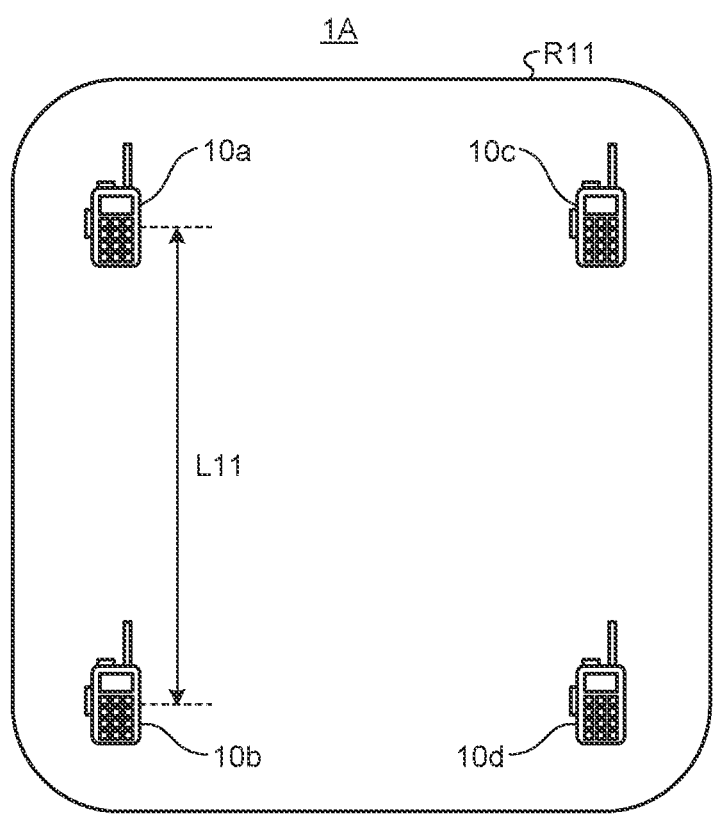
FIG. 8 is a diagram for explaining a process executed by a wireless communication system according to a second embodiment.
Figure 10:
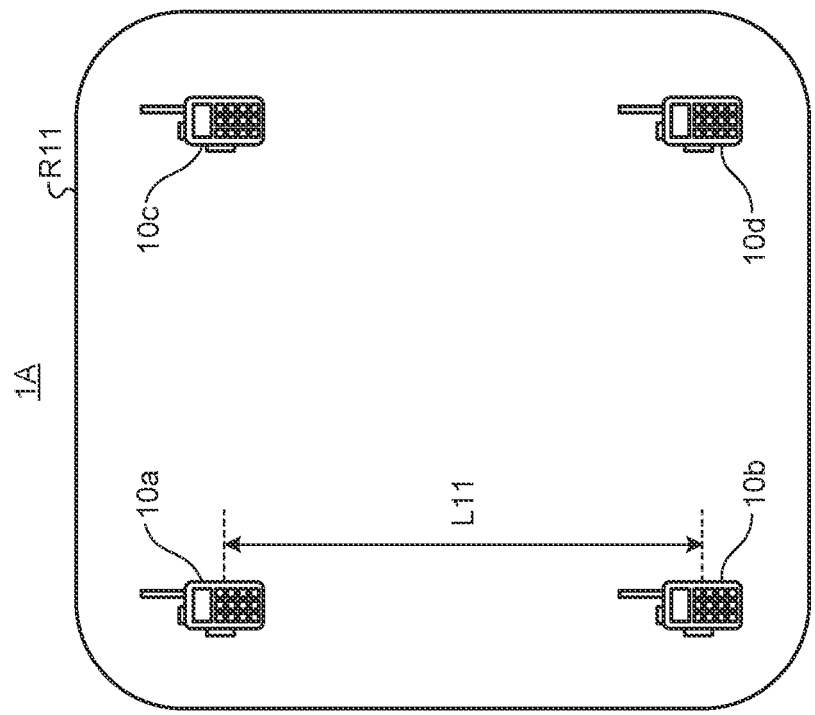
FIG. 10 is a diagram for explaining processes executed by the wireless communication system according to the second embodiment.

As illustrated in FIG. 8 to FIG. 10, in the second embodiment, a wireless communication system 1A includes the wireless communication device 10a, the wireless communication device 10b, the wireless communication device 10c, and the wireless communication device 10d. Each of the wireless communication devices 10 according to the second embodiment has the same configuration as the wireless communication device 10 illustrated in FIG. 2 and the description thereof will thus be omitted. In this second embodiment, the wireless communication device 10a and the wireless communication device 10b among the wireless communication devices 10a to 10d are set as base terminals. In the second embodiment, the distances between the wireless communication devices 10 in a formation are changed according to a distance between the wireless communication device 10a and the wireless communication device 10b.

FIG. 8 illustrates a formation at a normal time. The formation is, for example, a formation in which the wireless communication devices 10a to 10d are respectively arranged near vertices of an approximately quadrangular area R11. In the example illustrated in FIG. 8, there is a distance L11 between the wireless communication device 10a and the wireless communication device 10b. In this case, the wireless communication device 10c and the wireless communication device 10d are controlled such that the distance between the wireless communication device 10c and the wireless communication device 10d does not exceed the distance L11. For example, in a case in which the distance between the wireless communication device 10c and the wireless communication device 10d exceeds the distance L11, an alarm is output from the wireless communication device 10c and the wireless communication device 10d to urge users of the wireless communication device 10c and the wireless communication device 10d to decrease the distance. Each of the distance between the wireless communication device 10a and the wireless communication device 10c and the distance between the wireless communication device 10b and the wireless communication device 10d is preferably a distance allowing the users of the wireless communication devices 10a and 10c to be visible from each other and the users of the wireless communication devices 10b and 10d to be visible from each other.

FIG. 9 illustrates a formation for a search in a place with a good prospect. In the example illustrated in FIG. 9, at a place with a good prospect, the distance between the wireless communication device 10a and the wireless communication device 10b is changed from the distance L11 to a distance L12. This distance L12 is a distance longer than the distance L11 illustrated in FIG. 8. The distance L12 may be changed according to the prospect. As illustrated in FIG. 9, at the place with the good prospect, the wireless communication devices 10a to 10d are respectively arranged near vertices of an approximately quadrangular area R12 having an area larger than that of the area R11. In this case, if the distance between the wireless communication device 10c and the wireless communication device 10d exceeds the distance L12, an alarm is output from the wireless communication device 10c and the wireless communication device 10d to urge the users of the wireless communication device 10c and the wireless communication device 10d to decrease the distance. The distance between the wireless communication device 10a and the wireless communication device 10c and the distance between the wireless communication device 10b and the wireless communication device 10d may be the same as those of the example illustrated in FIG. 8 or may be longer than those of the example illustrated in FIG. 8.

FIG. 10 illustrates a formation for a search at a place with a poor prospect. In the example illustrated in FIG. 10, at a place with the poor prospect, the distance between the wireless communication device 10a and the wireless communication device 10b is changed from the distance L11 to a distance L13. This distance L13 is a distance shorter than the distance L11 illustrated in FIG. 8. The distance L13 may be changed according to the prospect. As illustrated in FIG. 10, at the place with the poor prospect, the wireless communication devices 10a to 10d are respectively arranged near vertices of an approximately quadrangular area R13 having an area smaller than that of the area R11. In this case, if the distance between the wireless communication device 10c and the wireless communication device 10d exceeds the distance L13, an alarm is output from the wireless communication device 10c and the wireless communication device 10d to urge the users of the wireless communication device 10c and the wireless communication device 10d to decrease the distance. The distance between the wireless communication device 10a and the wireless communication device 10c and the distance between the wireless communication device 10b and the wireless communication device 10d may be the same as those of the example illustrated in FIG. 8 or may be shorter than those of the example illustrated in FIG. 8.

As described above, in this second embodiment, when a team performs a search in a formation, the distances between members of the team can be maintained at appropriate distances according to the prospect at the place where the search is performed by setting two base terminals. According to this second embodiment, when a team performs a search in a formation, a secondary disaster, such as any of members of the team going missing, is able to be prevented.

According to the present application, a secondary disaster in a search performed by a team can be prevented.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth. For example, the predetermined distance in the first embodiment can be changed according to the distance between the base terminals in the second embodiment.

The distance notification device and the distance notification method according to the present application can be applied to, for example, a portable wireless communication device.

What is claimed is:

1. A distance notification device, comprising:
   a first positional information acquiring unit configured to acquire positional information on a user at a predetermined time interval;
   a second positional information acquiring unit configured to acquire positional information on multiple peripheral users present around the user and belonging to a group that the user belongs to at the predetermined time interval;
   a distance calculating unit configured to calculate respective distances between the user and the peripheral users based on the positional information on the user and the positional information on the peripheral users;
   a distance determining unit configured to determine whether or not each of the distances between the user and the peripheral users is equal to or longer than a predetermined distance;
   a coordinate information calculating unit configured to calculate and update coordinate information on a meeting point based on the positional information on the user and the positional information on the peripheral users; and
   a display configured to display various images; wherein the display is further configured to notify, by updating sequentially, the user of directional information toward the meeting point for the group that the user belongs to when a specific condition that a number of the peripheral users determined to be positioned at a distance equal to or longer than the predetermined distance from the user is equal to or larger than a predetermined number is satisfied, and to delete, if the directional information is notified, the directional information when the specific condition is not satisfied.

2. The distance notification device according to claim 1, wherein the coordinate information calculating unit is further configured to calculate, as the meeting point, a coordinate value of a gravity center of coordinate values indicating the positional information of the user and the peripheral users.

3. The distance notification device according to claim 1, wherein, when the specific condition is satisfied, information indicating that the distance has become equal to or longer than the predetermined distance is transmitted to other wireless communication devices or received from other wireless communication devices, and when the specific condition is no longer satisfied, information indicating that the specific condition is no longer satisfied is transmitted to other wireless communication devices or received from other wireless communication devices if the directional information is notified.

4. The distance notification device according to claim 1, wherein the directional information is notified by displaying an arrow in the display.

5. A distance notification method, including steps of:
   acquiring positional information on a user at a predetermined time interval;
   acquiring positional information on multiple peripheral users present around the user and belonging to a group that the user belongs to at the predetermined time interval;
   calculating respective distances between the user and the peripheral users based on the positional information on the user and the positional information on the peripheral users;
   determining whether or not each of the distances between the user and the peripheral users is equal to or longer than a predetermined distance;
   calculating and updating coordinate information on a meeting point based on the positional information on the user and the positional information on the peripheral users;
   notifying, by updating sequentially, the user of directional information toward the meeting point for the group that the user belongs to when a specific condition that a number of the peripheral users determined to be positioned at a distance equal to or longer than the predetermined distance from the user is equal to or larger than a predetermined number is satisfied; and deleting, if the directional information is notified, the directional information when the specific condition is not satisfied.

\* \* \* \* \*